(12) United States Patent
Liu

(10) Patent No.: US 8,594,034 B2
(45) Date of Patent: Nov. 26, 2013

(54) METHOD FOR JOINING A NETWORK, AND METHOD AND APPARATUS FOR TRANSMITTING FRAMES

(75) Inventor: Yongjun Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 13/215,716

(22) Filed: Aug. 23, 2011

(65) Prior Publication Data

US 2011/0305142 A1 Dec. 15, 2011

Related U.S. Application Data

(63) Continuation of application No. PCT/CN2010/070715, filed on Feb. 23, 2010.

(30) Foreign Application Priority Data

Feb. 23, 2009 (CN) .......................... 2009 1 0078250
Mar. 6, 2009 (CN) .......................... 2009 1 0119168

(51) Int. Cl.
*H04W 4/00* (2009.01)

(52) U.S. Cl.
USPC ............................ 370/329; 370/392; 370/465

(58) Field of Classification Search
USPC .......... 370/328–329, 335–336, 342–343, 345, 370/389, 392, 400–401, 437, 441–443, 458, 370/462, 465, 474, 476
See application file for complete search history.

(56) References Cited

U.S. PATENT DOCUMENTS 6,332,077 B1   12/2001 Wu et al.
7,548,521 B2 *  6/2009 Jogi et al. ...................... 370/328
(Continued)

FOREIGN PATENT DOCUMENTS

CN   1586056 A   2/2005
CN   1628437 A   6/2005
(Continued)

OTHER PUBLICATIONS

Written Opinion of the International Searching Authority from the Chinese Patent Office in International Application Application No. PCT/CN2010/070715 mailed May 27, 2010.

(Continued)

*Primary Examiner* — Kevin Mew
(74) *Attorney, Agent, or Firm* — Leydig, Voit & Mayer, Ltd.

(57) ABSTRACT

A beacon-based network, a method for joining a network, and a method and an apparatus for transmitting frames are disclosed. The beacon-based network includes: a device node, configured to carry superframe time sequence indication information in a data frame and/or command frame and send the frame during the process of communicating with a coordinator node; and a pending node, configured to: monitor a packet transmitted in a network, and request to join the network according to a beacon if the beacon is monitored; obtain beacon information, which includes superframe time sequence indication information, from a monitored data frame or command frame after monitoring the data frame or command frame, and request to join the network through a monitored network operating channel according to the beacon information. The foregoing technical solution shortens the time spent by the pending node in monitoring the beacon, and reduces the time spent by the pending node in requesting to join the network.

13 Claims, 6 Drawing Sheets

(56) References Cited

U.S. PATENT DOCUMENTS

| | | | |
|---|---|---|---|
| 7,593,422 B2 * | 9/2009 | Shvodian | 370/442 |
| 7,804,804 B2 * | 9/2010 | Sugaya et al. | 370/338 |
| 7,885,174 B2 * | 2/2011 | Welborn et al. | 370/203 |
| 8,233,435 B2 * | 7/2012 | Cordeiro et al. | 370/328 |
| 8,320,340 B2 * | 11/2012 | Sim et al. | 370/336 |
| 8,457,553 B2 * | 6/2013 | Dharmaraju et al. | 455/41.2 |
| 2003/0063619 A1 * | 4/2003 | Montano et al. | 370/443 |
| 2003/0137993 A1 | 7/2003 | Odman | |
| 2004/0229619 A1 * | 11/2004 | Adatrao et al. | 455/442 |
| 2005/0128988 A1 | 6/2005 | Simpson et al. | |
| 2005/0249167 A1 * | 11/2005 | Salokannel | 370/336 |
| 2006/0140215 A1 | 6/2006 | Fleming | |
| 2007/0183360 A1 * | 8/2007 | Arunan et al. | 370/328 |
| 2007/0223431 A1 | 9/2007 | Jaakkola | |
| 2009/0097440 A1 * | 4/2009 | Sakoda | 370/328 |
| 2009/0213816 A1 * | 8/2009 | Guo et al. | 370/336 |
| 2009/0310573 A1 * | 12/2009 | Sim et al. | 370/336 |
| 2010/0111048 A1 * | 5/2010 | Shim et al. | 370/336 |
| 2010/0157955 A1 * | 6/2010 | Liu et al. | 370/336 |
| 2012/0300753 A1 * | 11/2012 | Brown et al. | 370/336 |

FOREIGN PATENT DOCUMENTS

| | | |
|---|---|---|
| CN | 101317384 A | 12/2008 |
| WO | WO 2006/039081 A2 | 4/2006 |
| WO | WO 2006/099002 A2 | 9/2006 |
| WO | WO 2007/031855 A2 | 3/2007 |

OTHER PUBLICATIONS

Struik, "Draft D17 Clause 7.6 Security Recommendation for Low-Rate IEEE 802.15.4 WPAN" IEEE, Piscataway, NJ, USA, pp. 1-130, Nov. 1, 2002.

Supplementary European Search Report, Communication regarding the transmission of the European Search Report, and European Search Opinion for EP Application No. 10743426.8, mailed Dec. 6, 2011.

First Chinese Office Action (Partial Translation) issued in related Application No. 200910119168.3; dated (mailed) May 3, 2012.

$2^{nd}$ Office Action in corresponding Chinese Patent Application No. 200910119168.3 (Feb. 4, 2013).

* cited by examiner

METHOD FOR JOINING A NETWORK, AND METHOD AND APPARATUS FOR TRANSMITTING FRAMES

CROSS-REFERENCE TO RELATED APPLICATIONS

This application is a continuation of International Application No. PCT/CN2010/070715, filed on Feb. 23, 2010, which claims priorities to Chinese Patent Application No. 200910078250.6, filed on Feb. 23, 2009 and Chinese Patent Application No. 200910119168.3, filed on Mar. 6, 2009, all of which are hereby incorporated by reference in their entireties.

FIELD OF THE INVENTION

The present invention relates to the field of network communication technologies, and in particular, to a method for joining a network, and a method and network device for transmitting frames in a beacon-based network.

BACKGROUND OF THE INVENTION

Beacon-based networks are based on beacon technologies, and are a type of single-hop or multi-hop ad hoc network formed through beacon synchronization. Currently, many types of networks such as radio sensor networks are based on beacon technologies.

Nodes in a beacon-based network are classified into a coordinator node and a device node. The coordinator node is responsible for coordinating communication and sending necessary network information. The device node joins the network by monitoring network information sent by the coordinator node, and communicate with another node as coordinated by the coordinator node. A node that already joins the network may serve as both a coordinator node and a device node. When this node coordinates communication of another node and sends necessary network information, this node serves as a coordinator node; when this node accepts coordination performed by another coordinator node and communicates with another node, this node serves as a device node.

The process of a device node joining a network is also known as an association process. The association may be association arising from the device node joining the network initially, or may be reassociation caused by the mobility of the device node.

A general association process is: A pending node monitors beacons (also known as beacon frames), each of which specifies the communication time sequence of nodes (such as a dedicated communication timeslot allocated to the node) and network information (such as the period of a beacon and duration of a superframe). The pending node sends an association request to a target coordinator node according to a beacon when the beacon is monitored. The coordinator node receives the association request, and returns an association response to the pending node if approving the pending node to join the network. The pending node is associated after receiving the association response.

Generally, the beacon is sent periodically, and the sending period is D×2BO, where BO (Beacon Order, Beacon Order) is a parameter which decides the communication time sequence of nodes, and D is basic superframe duration. If merely one coordinator node exists in a radio sensor network and no receiving error occurs, the pending node monitors a beacon at a mean interval of ½×D×2BO. The mean interval affects association delay. At a 2.4 GHz band, delay (D)=15.36 ms. If BO=10, the mean interval is 7.86 s, namely, the mean association delay is at least 7.86 s. Besides, the channel environment in an actual network is not as good as expected, and collisions generally exist in the network. Consequently, the pending node does not receive every beacon successfully, and the association delay is even larger.

SUMMARY OF THE INVENTION

Embodiments of the present invention provide a beacon-based network, a method for joining a network, and a method and an apparatus for transmitting frames so that a pending node can monitor beacons at shorter intervals.

An embodiment of the present invention provides a beacon-based network, including:

a device node, configured to carry superframe time sequence indication information in a data frame and/or a command frame and send the frame during the process of communicating with a coordinator node; and/or the coordinator node, configured to carry superframe time sequence indication information in a data frame and/or command frame during the process of communicating with the device node; and a pending node, configured to: monitor a packet transmitted in the network, and request to join the network according to a beacon if the beacon is monitored; obtain beacon information, which includes the superframe time sequence indication information, from the monitored data frame or the monitored command frame if the data frame or the command frame is monitored, and request to join the network through a network operating channel of the monitored data frame or the monitored command frame according to the beacon information.

An embodiment of the present invention provides a method for joining a network, including:

monitoring a packet transmitted in a network;

requesting to join the network according to a beacon if the beacon is monitored; and obtaining beacon information, which includes superframe time sequence indication information, from a monitored data frame or a monitored command frame if the data frame or the command frame is monitored, where the data frame or the command frame carries the superframe time sequence indication information, and requesting to join the network through a channel of the monitored data frame or the monitored command frame according to the beacon information.

An embodiment of the present invention provides another method for transmitting frames in a beacon-based network, including:

by a device node and/or a coordinator node, carrying superframe time sequence indication information in a data frame and/or a command frame during the process of communication between the device node and the coordinator node; and sending the data frame and/or the command frame, where the data frame and/or the command frame includes the superframe time sequence indication information.

An embodiment of the present invention provides another method for transmitting frames in a beacon-based network, including:

by a coordinator node, receiving a request for joining the network from a pending node; and carrying beacon information unknown to the pending node in a join response after determining that the request for joining the network carries information indicating that the pending node requests to join the network by monitoring a data frame or a command frame, and sending the join response to the pending node.

An embodiment of the present invention provides a network device, including:

a monitoring module, configured to monitor a packet transmitted in a network;

an obtaining module, configured to obtain beacon information from a beacon if the beacon is monitored by the monitoring module, and obtain beacon information, which includes superframe time sequence indication information, from a monitored data frame or a monitored command frame after the monitoring module monitors the data frame or the command frame, where the data frame or the command frame carries the superframe time sequence indication information; and a requesting module, configured to request to join the network according to the beacon information obtained by the obtaining module from the beacon, or request to join the network through a network operating channel of the data frame or the command frame monitored by the monitoring module according to the beacon information obtained by the obtaining module from the data frame or the command frame.

An embodiment of the present invention provides another network device, including:

a first frame constructing module, configured to carry superframe time sequence indication information in a data frame and/or a command frame during the process of communication between a device node and a coordinator node; and a first sending module, configured to send the data frame and/or the command frame constructed by the first frame constructing module.

An embodiment of the present invention provides another network device, including:

a receiving module, configured to receive a request for joining a network from a pending node;

a judging module, configured to judge whether the request for joining the network carries information indicating that the pending node requests to join the network by monitoring a data frame or a command frame;

a second frame constructing module, configured to carry beacon information unknown to the pending node in a join response if the judging result of the judging module is that the request carries information indicating that the pending node requests to join the network by monitoring the data frame or the command frame; and a second sending module, configured to send the join response to the pending node.

It can be seen from the foregoing description of the technical solution that, superframe time sequence indication information is added to a data frame and/or a command frame, where the data frame and/or the command frame is transmitted between the device node and the coordinator node, and therefore, the pending node can obtain necessary information required for requesting to join the network through the monitored data frame and/or the monitored command frame. In this way, the pending node can request to join the network no matter whether the pending node monitors the beacon or monitors the data frame and/or the command frame, where the data frame and/or the command frame is transmitted between the device node and the coordinator node. Therefore, the association delay is reduced and the network mobility is improved without increasing network implementation costs or affecting network density or network energy consumption performance. Besides, when multiple pending nodes exist, each pending node can request to join the network by monitoring a beacon or monitoring a data frame and/or a command frame. Therefore, the phenomenon that multiple pending nodes request to join the network simultaneously in a certain period after monitoring the same beacon is avoided, and the probability of collisions in the process of requesting to join the network is reduced.

DETAILED DESCRIPTION OF THE EMBODIMENTS

Figure 1:
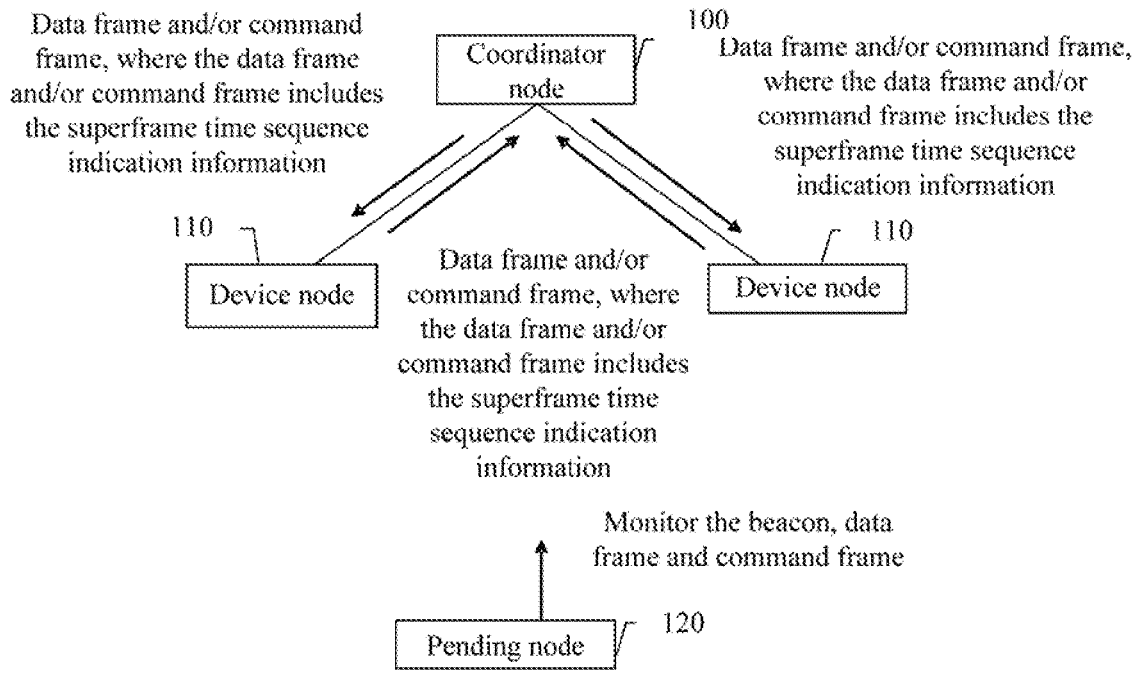
FIG. 1 is a schematic structural diagram of a beacon-based network according to a first embodiment of the present invention.

When a pending node requests to join a network, the pending node obtains beacon information from a beacon (namely, a beacon frame). The beacon information may include: coordinator address, network identifier, network operating channel, superframe time sequence, link quality and security attribute. A transmission channel of the beacon is the network operating channel. To request to join the network, the pending node must know the coordinator address, network identifier, network operating channel, and superframe time sequence in the beacon information.

In the process of implementing the present invention, an inventor finds that: The data frame and the command frame that are transmitted between the coordinator node and the device node carry the coordinator address, network identifier, and security attribute, and the transmission channel of the data frame and the command frame can serve as a network operating channel. In this way, if the pending node monitors the data frame and/or the command frame, the pending node can obtain part of the beacon information from the monitored data frame or the monitored command frame, and this part of beacon information includes the beacon information required by the pending node for requesting to join the network. The comparison between the beacon information required by the pending node for requesting to join the network and the beacon information obtained by the pending node from the data frame/command frame shows that the beacon information obtained by the pending node from the data frame/command frame lacks the superframe time sequence. If the pending node can obtain the superframe time sequence, the pending node can request to join the network by monitoring a data frame and/or a command frame.

The inventor also finds that: The data frame and the command frame that are transmitted between the coordinator node and the device node are sent according to the preset superframe time sequence no matter whether the frame is sent by the coordinator node or the device node. Therefore, the sender knows the superframe time sequence. If the sender adds the superframe time sequence indication information to the data frame and/or the command frame when sending the data frame and/or the command frame, the pending node can know all beacon information required for requesting to join the network by monitoring the data frame and/or the command frame, where the data frame and/or the command frame is transmitted between the device node and the coordinator node, and therefore, the pending node can request to join the network by monitoring the data frame and/or the command frame.

The embodiments of the present invention are detailed below with reference to the accompanying drawings.

Embodiment 1

Beacon-Based Network

The beacon-based network may be a synchronization network or non-synchronization network, and may be a network in which a beacon is sent periodically or sent at irregular intervals. For example, in a network in which the beacon is sent at irregular interval, the coordinator node does not send a beacon until a beacon request is received. The structure of the beacon-based network is as shown in FIG. 1.

The network shown in FIG. 1 includes multiple nodes, for example, one coordinator node 100, multiple device nodes 110 that have joined the network, and one pending node 120. It should be noted that the device nodes 110 that have joined the network and the pending node 120 are device nodes; moreover, the number of nodes in FIG. 1 is illustrative only, and the number of different nodes may vary. For example, there are at least two coordinator nodes 100, one device node 110 that has joined the network, and at least two pending nodes 120.

The device nodes 110 and/or the coordinator node 100 carries the superframe time sequence indication information in a data frame and/or a command frame and sends the data frame and/or the command frame during the process of communication between the device nodes 110 and the coordinator node 100. In FIG. 1, the data frame and/or the command frame sent by the device nodes 110 to the coordinator node 100 and the data frame and/or the command frame sent by the coordinator node 100 to the device nodes 110 both carry the superframe time sequence indication information. In practice, however, it is appropriate that only the data frame and/or the command frame sent by the device nodes 110 to the coordinator node 100 carries the superframe time sequence indication information, and that the data frame and/or the command frame sent by the coordinator node 100 to the device nodes 110 carries no superframe time sequence indication information; or, it is appropriate that only the data frame and/or the command frame sent by the coordinator node 100 to the device nodes 110 carries the superframe time sequence indication information, and that the data frame and/or the command frame sent by the device nodes 110 to the coordinator node 100 carries no superframe time sequence indication information.

The pending node 120 monitors a packet transmitted in the network, which is also known as scanning the network. The pending node 120 may monitor the packet transmitted in the network in ways rather than address filtering, for example, in a promiscuous mode. When monitoring the packet transmitted in the network in ways rather than address filtering, the pending node 120 may receive a packet destined for any destination address.

The pending node 120 may monitor the packet transmitted in the network in the following way: send a beacon request first and then monitor the packet transmitted in the network, or monitor the packet transmitted in the network directly without sending any beacon request. In a network in which the beacon is sent periodically, either of the foregoing ways is applicable. In a network in which the beacon is sent at irregular intervals, the pending node may send one or more beacon request first and then monitor the packet transmitted in the network. The foregoing sending a beacon request may be sending a beacon request first, or may be sending multiple beacon requests first. The number of beacon requests sent by the pending node may be determined according to the preset information.

When monitoring a beacon, the pending node 120 obtains beacon information from the beacon, and uses the beacon information to request to join the network. For example, the pending node 120 sends a request for joining the network to the coordinator node 100 by using the beacon information. An example of the request for joining the network is an association request, which is a lower-layer protocol request. The request for joining the network may also be other requests, such as an upper-layer protocol request.

The pending node 120 obtains beacon information, which includes the superframe time sequence indication information, from a monitored data frame or a monitored command frame if the data frame or the command frame is monitored, where the data frame or the command frame carries the superframe time sequence indication information. The beacon information obtained from the data frame or the command frame combines with the transmission channel of the monitored data frame or the monitored command frame to form all necessary information required by the pending node 120 for requesting to join the network. Therefore, the pending node 120 can request to join the network through the monitored network operating channel by using the beacon information obtained from the data frame or command frame.

The coordinator node 100 receives the request for joining the network from the pending node 120, and sends a join response to the pending node 120. The pending node 120 joins the network successfully after receiving the join response. An example of the join response is an association response. When the request for joining the network is based on protocols of other layers, the join response is also based on protocols of other layers.

The operations performed by the coordinator node 100, the device nodes 110, and the pending node 120, the form of the superframe time sequence indication information, other indication information carried in the data frame and/or the command frame, and the structure of each node are described in the following embodiments, and are not described in detail here.

It should be noted that in the preceding first embodiment, the request for joining the network and the join response are also command frames. Therefore, the command frame monitored by the pending node 120 includes the request for joining the network from another pending node and the join response sent by the coordinator node 100.

In addition, in the following embodiments, it is assumed that the pending node sends an association request, receives an association response, and joins the network accordingly. In practice, a request for joining the network and a response for joining the network that are in another type may be applied in the technical solutions of the following embodiments. However, the pending node monitors the data frame and/or the command frame in similar procedures with those of other embodiments regardless of the mode of joining the network.

In the first embodiment described above, superframe time sequence indication information is added to a data frame and/or a command frame, where the data frame and/or the command frame is transmitted between the device node and the coordinator node, and therefore, the pending node may obtain necessary information required for requesting to join the network through the monitored data frame and/or the monitored command frame. In this way, the pending node may request to join the network no matter whether the pending node monitors the beacon or monitors the data frame and/or the command frame, where the data frame and/or the command frame is transmitted between the device node and the coordinator node. Therefore, the association delay is reduced and the network mobility is improved without increasing network implementation costs or affecting network density or network energy consumption performance. For example, in the case of 2.4 GHz, if BO=10, SO (Superframe Order, Superframe Order)=6, and a single coordinator node exists in the network, this embodiment of the present invention can reduce the mean association delay by 12%; if BO=10, SO=6, and multiple coordinator nodes exist in the network, this embodiment of the present invention reduces the mean association delay more noticeably, for example, reduces the mean association delay by 44% if 4 coordinator nodes exist. From another perspective, the device node can monitor the data frame and/or command frame to obtain the beacon information required for joining the network, which avoids the following problem: The pending node has to wait for a next beacon when failing to monitor a beacon due to factors such as channel environment or interference. Therefore, the reliability of transmitting the beacon information is improved. And beacon information transmission with high reliability also reduces the mean association delay. For example, in the case of 2.4 GHz, if BO=10, SO=6, and a single coordinator node exists in the network, this embodiment of the present invention enables the pending node to receive the beacon information correctly at a probability of 90%, and reduces the mean association delay by 28%. Besides, when multiple pending nodes exist, each pending node can request to join the network by monitoring a beacon or monitoring a data frame and/or monitoring a command frame. Therefore, the phenomenon that multiple pending nodes request to join the network simultaneously in a certain period after monitoring the same beacon is avoided, and the probability of collisions in the process of requesting to join the network is reduced, namely, the collisions of transmitting the requests for joining the network are reduced. It should also be noted that in a network in which the beacons are sent at irregular intervals, the coordinator node receives no beacon request from the pending node in the periodical sleep process. However, in the periodical sleep process of the coordinator node or when the coordinator node just changes from the periodical sleep state to the active period, so long as a data frame or a command frame, where the data frame or the command frame carries superframe time sequence indication information and are sent by another node, is transmitted in the network, the pending node can obtain the beacon information from the data frame or the command frame, and can request to join the network through the monitored network operating channel, which reduces the association delay. Further, if the pending node sends one or more beacon requests during the periodical sleep process of the coordinator node, whereupon another node in the network starts sending a series of packets, the series of packets make the pending node unable to go on sending beacon requests, but the pending node can obtain the beacon information that includes the superframe time sequence indication information by monitoring the data frame and/or the command frame, where the data frame and/or the command frame is transmitted in the network, and request to join the network by using the beacon information. In this way, the problem of missing the active period of the coordinator node is avoided, and the association delay is reduced.

Embodiment 2

Method for Transmitting Frames in a Beacon-Based Network

Figure 2:
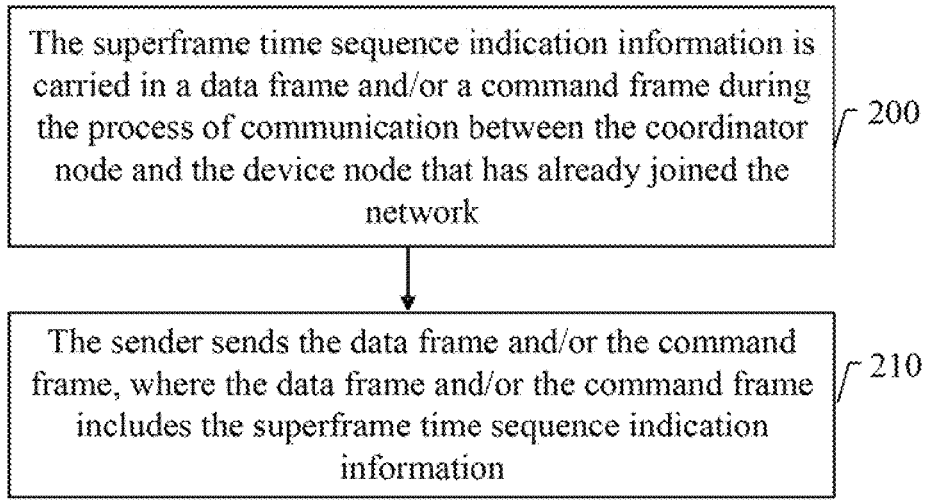
FIG. 2 is a flowchart of a method for transmitting frames in a beacon-based network according to a second embodiment of the present invention.

The flowchart of the method is as shown in FIG. 2.

Step 200 in FIG. 2: The superframe time sequence indication information is carried in a data frame and/or a command frame during the process of communication between a device node and a coordinator node. The device node may be a device node that has already joined the network, or a device node that has not joined the network successfully. That is, the command frame includes the association request sent by the device node that has not joined the network successfully.

In step 200, the device node and/or the coordinator node carries the superframe time sequence indication information in the data frame and/or the command frame. That is, the data frame and/or the command frame, where the data frame and/or the command frame carries the superframe time sequence indication information, may refer to only the data frame and/or the command frame, where the data frame and/or the command frame is sent by the device node to the coordinator node, or may refer to only the data frame and/or command frame, where the data frame and/or the command frame is sent by the coordinator node to the device node, or may refer to the data frame and/or the command frame, where the data frame and/or the command frame is sent from the device node to the coordinator node or sent from the coordinator node to the device node.

The sender may carry the superframe time sequence indication information in the data frame only, or carry the superframe time sequence indication information in the command frame only, or carry the superframe time sequence indication information in both the sent data frame and the command frame.

The superframe time sequence indication information may be the superframe time sequence indication information in the prior art, namely, the superframe time sequence indication information includes the superframe time sequence information such as the start time of the beacon, superframe structure, and dedicated timeslot position. In this case, the superframe time sequence indication information includes many contents, and the superframe time sequence indication information may be carried after the frame header.

The foregoing superframe time sequence indication information may be simplified, for example, simplified to a flag bit. This flag bit means that the pending node may be allowed/forbidden to join the network. For example, if the superframe time sequence indication information is 1, the pending node is allowed to join the network. In this case, the pending node may send an association request immediately, or send the association request within a first preset time interval in order to join the network. When the superframe time sequence indication information is 0, the pending node is forbidden to join the network. In this case, the pending node is unable to send the association request, and can go on with monitoring. The first preset time interval may be the duration known by each node beforehand, for example, default duration. This duration may be a time constant Ta. The first preset time interval may also be carried in the superframe time sequence indication information. If the command frame that carries the superframe time sequence indication information is an association request, the superframe time sequence indication information may be (Ta-Tb), where Ta is the first preset time interval and Tb is the delay time spent by the pending node in sending the association request.

It should be noted that the superframe time sequence indication information may be only an indication of allowing the pending node to join the network. In the case that the pending node is forbidden to join the network, the coordinator node or device node may not carry the superframe time sequence indication information in the data frame and/or the command frame.

In the case that the superframe time sequence indication information is carried in the data frame and/or the command frame sent bidirectionally between the coordinator node and the device node, the data frame and command frame need to further carry coordinator indication information. The coordinator indication information indicates whether the address of the coordinator node is a source address or destination address in the data frame or command frame. That is, the pending node may obtain the source address information or destination address information from the data frame or command frame according to the coordinator indication information, and use the obtained address information as coordinator address information.

In the case that the superframe time sequence indication information is carried in the data frame and/or the command frame, where the data frame and/or the command frame is transmitted unidirectionally between the coordinator node and the device node, the data frame and command frame may carry coordinator indication information or may not carry coordinator indication information. If the data frame and command frame carry no coordinator indication information, the pending node should know beforehand whether the data frame and/or the command frame sent from the coordinator node to the device node carries the superframe time sequence indication information, or the data frame and/or the command frame sent from the device node to the coordinator carries the superframe time sequence indication information. That is, the pending node should know beforehand whether the coordinator address is the source address or the destination address in the data frame and/or the command frame, where the data frame and/or the command frame carries the superframe time sequence indication information.

Figure 3:
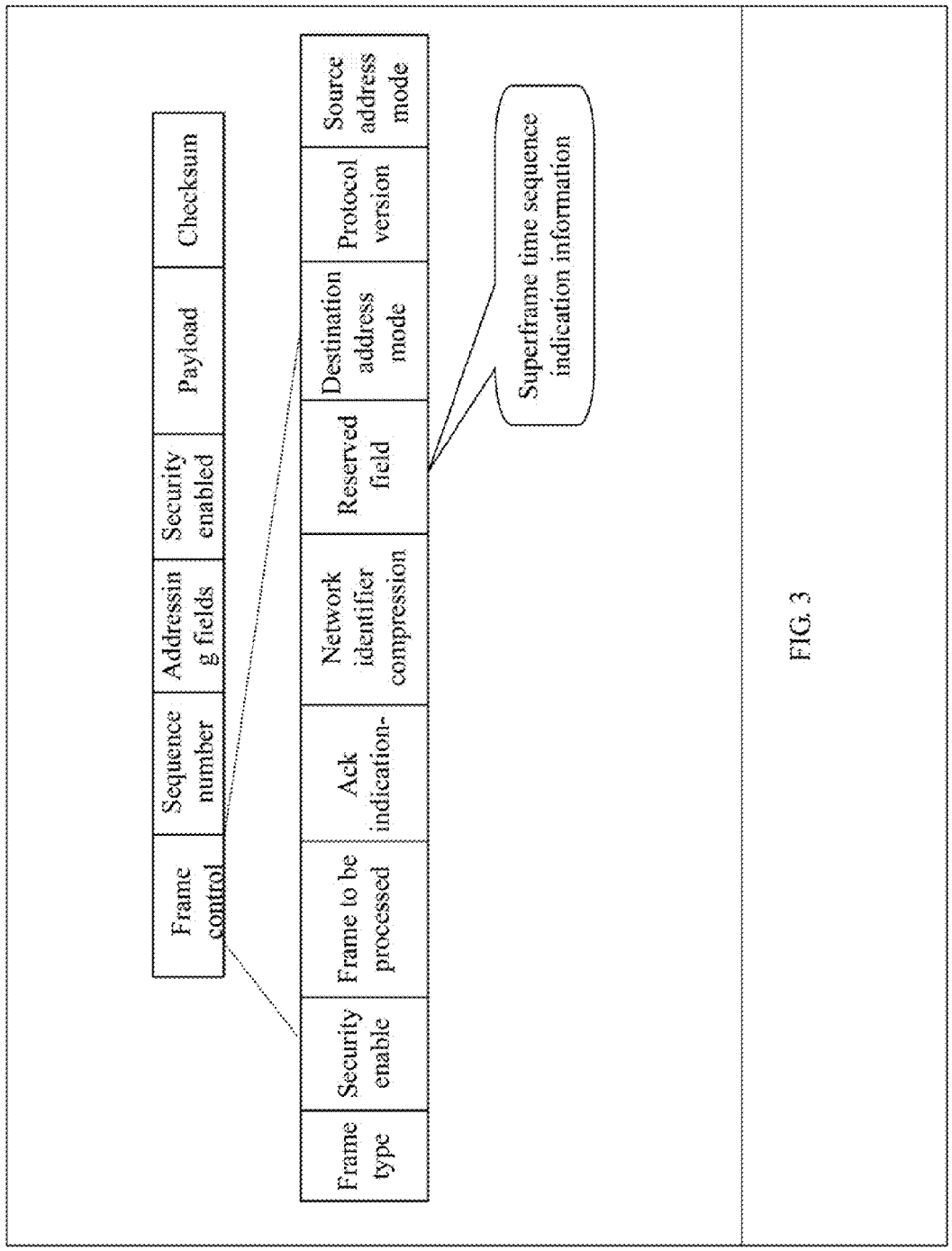
FIG. 3 is a schematic structural diagram of a data frame or a command frame according to the second embodiment of the present invention.

The following describes the data frame or the command frame with reference to FIG. 3, where the data frame or the command frame carries the coordinator indication information. FIG. 3 shows a format of a data frame or a command frame. The data frame differs from the command frame in that: The payload of the command frame carries a unique command identifier and content. In this embodiment, a reserved field in the control field of a frame header shown in FIG. 3 may carry 1-bit superframe time sequence indication information, and may further carry 1-bit coordinator indication information. For one example, when the information carried in the reserved field is "10", it indicates that the pending node is allowed to send an association request to the source address in the data frame or command frame within the time period of Ta; for another example, when the information carried in the reserved field is "11", it indicates that the pending node is allowed to send an association request to the destination address in the data frame or the command frame within the time period of Ta.

Step 210: The sender such as the coordinator node sends the data frame and/or the command frame, where the data frame and/or the command frame carries the superframe time sequence indication information.

The coordinator node receives the association request sent by the pending node. If the pending node requests to join the network according to the beacon if the beacon is monitored, the pending node obtains all beacon information. In this case, the coordinator node may perform the corresponding operation according to the existing protocol, for example, send an association response specified in the existing protocol to the pending node after receiving the association request sent by the pending node.

If the pending node requests to join the network according to the monitored data frame and/or the command frame, where the monitored data frame and/or the monitored command frame carries the superframe time sequence indication information, the pending node does not know all beacon information. In this case, the coordinator node needs to send the beacon information unknown to the pending node to the pending node. Such unknown beacon information may be carried in an association response and sent to the pending node. In this case, the association response needs to be extended to carry the beacon information unknown to the pending node. The beacon information unknown to the pending node is BO, SO, dedicated timeslot position, and beacon position; or may be BO, SO, and coordinator sleep time sequence information; or may be BO, SO, and coordinator activity time sequence information. The unknown beacon information such as BO, SO, dedicated timeslot position, and beacon position may be applicable to a network in which the beacons are sent periodically; and the unknown beacon information such as BO, SO, coordinator sleep time sequence and coordinator activity time sequence may be applicable to a network in which the beacons are sent at irregular intervals.

According to the information carried in the association request sent by the pending node, the coordinator node judges whether the pending node requests to join the network according to the information carried in the data frame or command frame or according to the information carried in the beacon. For example, if the association request carries information indicating that the pending node requests to join the network by monitoring the data frame or the command frame, the coordinator node may judge that the pending node requests to join the network according to the information carried in the data frame or the command frame; if the association request carries no information indicating that the pending node requests to join the network by monitoring the data frame or the command frame (for example, if the format of the received association request is the same as the format specified in the existing protocol), the coordinator node may judge that the pending node requests to join the network according to the information carried in the beacon. The information indicating that the pending node requests to join the network by monitoring the data frame or command frame may be a flag bit. For example, if the information indicating that the pending node requests to join the network by monitoring the data frame or the command frame is "1", it indicates that the pending node sends the association request according to the monitored data frame or the monitored command frame; if the association request carries no information indicating that the pending node requests to join the network by monitoring the data frame or the command frame, or if the information indicating that the pending node requests to join the network by monitoring the data frame or the command frame is "0", it indicates that the pending node sends the association request according to the beacon.

Figure 4:
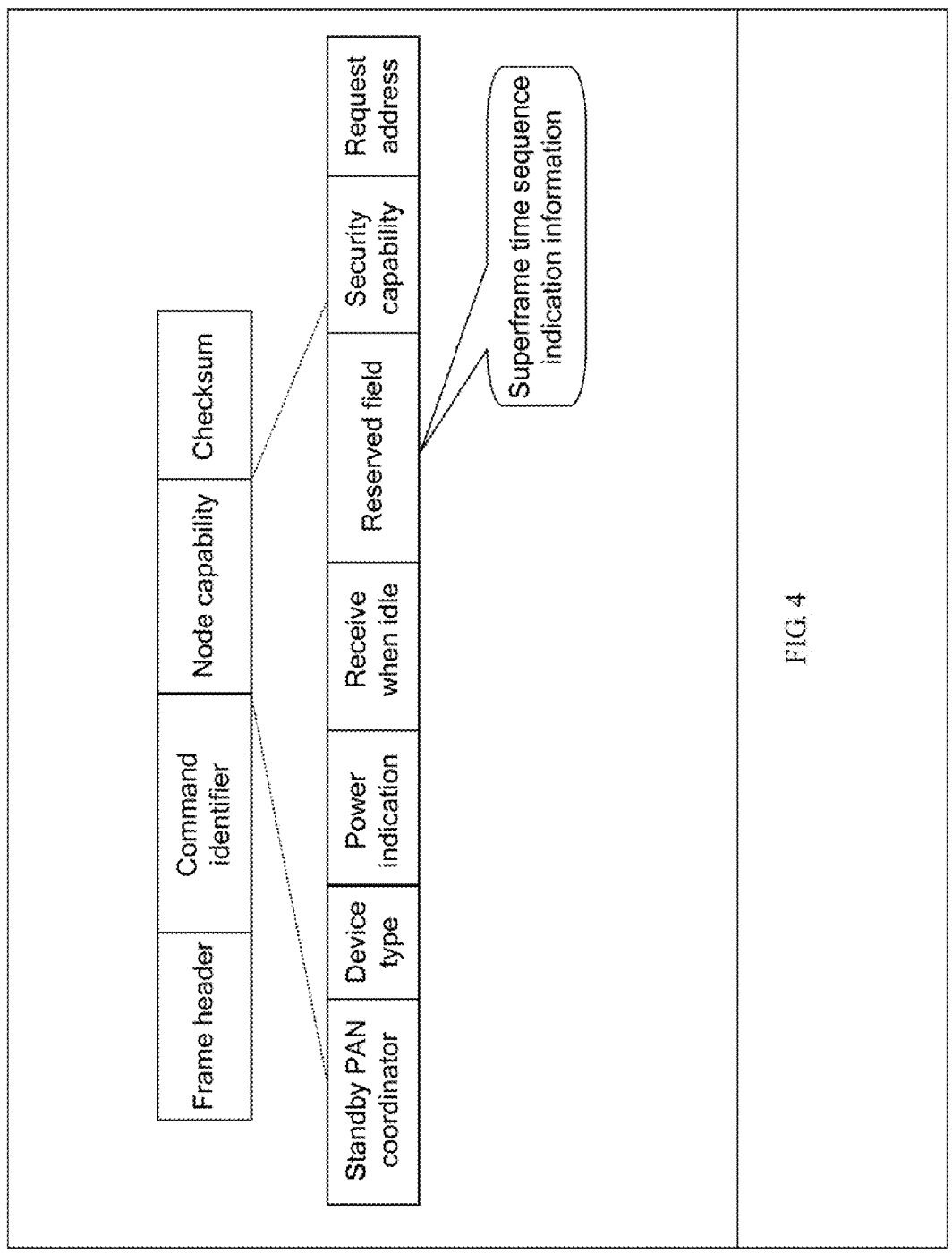
FIG. 4 is a schematic structural diagram of an association request according to the second embodiment of the present invention.

With reference to FIG. 4, the following uses examples to describe the association request that carries information, which indicates that the pending node requests to join the network by monitoring the data frame or the command frame. FIG. 4 shows a format of an association request. A reserved field of the node capability shown in FIG. 4 may carry 1-bit information indicating that the pending node requests to join the network by monitoring the data frame or the command frame. For example, when the information carried in the reserved field of the node capability is "0", it indicates that the association request is sent by the pending node according to the beacon if the beacon is monitored; when the information carried in the reserved field of the node capability is "1", it indicates that the association request is sent by the pending node according to the monitored data frame or the monitored command frame.

Figure 5:
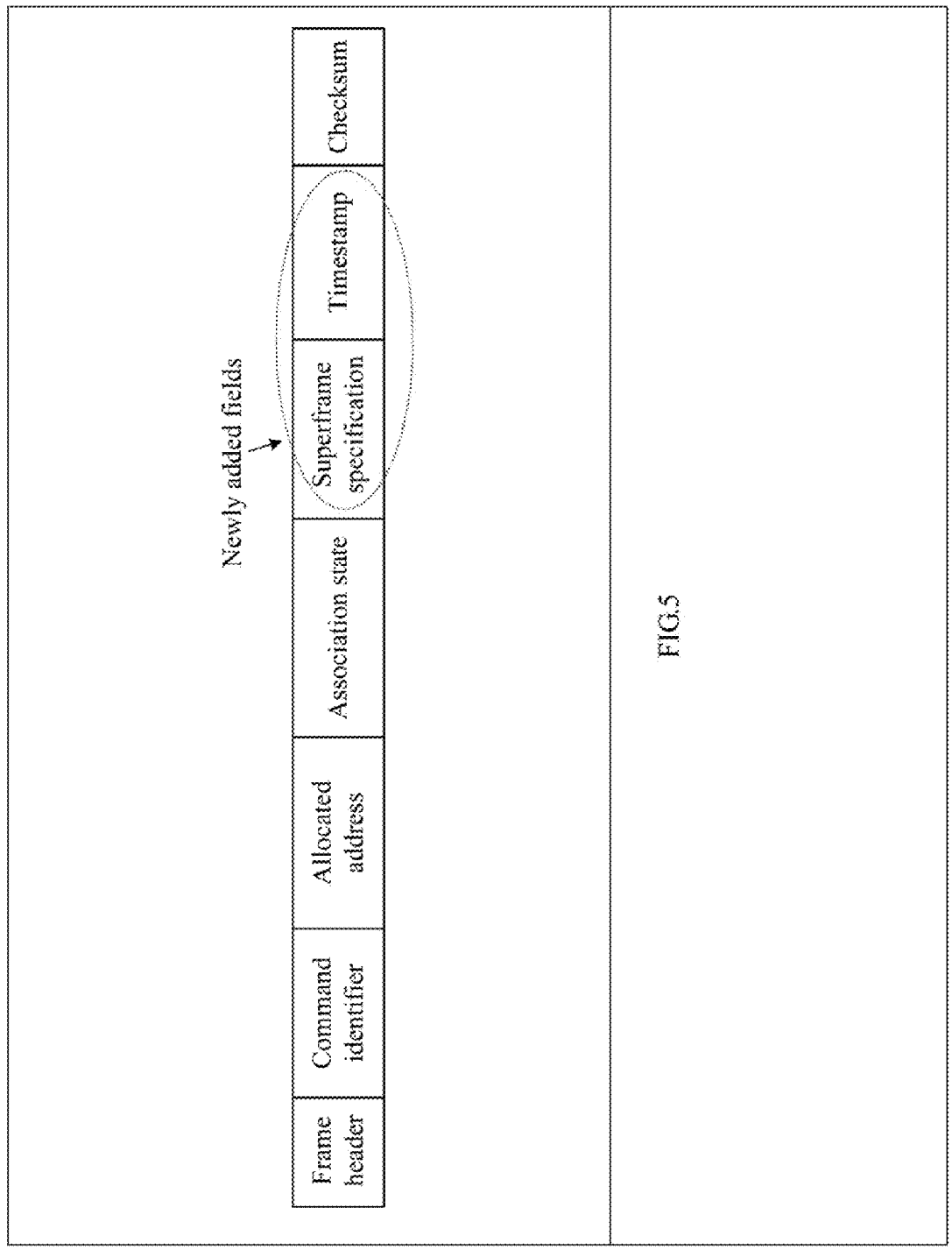
FIG. 5 is a schematic structural diagram of an association response according to the second embodiment of the present invention.

The following uses examples to describe the association response that carries beacon information unknown to the pending node with reference to FIG. 5. FIG. 5 shows a format of an association response. In this embodiment, the beacon information unknown to the pending node may be carried in the superframe specification and timestamp shown in FIG. 5. For one example, the timestamp carries information about the start time of the very previous beacon, and the superframe specification carries information about the BO parameter, SO parameter, and start time of the dedicated timeslot. For another example, the timestamp carries information about the coordinator node sleep/activity time sequence, and the superframe specification carries information such as BO parameter and SO parameter.

The information about the coordinator node sleep time sequence may be the start time of the very previous sleep and end time of the very previous sleep; or may be the start time and sleep period of the very previous sleep; or may be the end time and sleep period of the very previous sleep; or may be a sleep period.

The information about the coordinator node activity time sequence may be the start time of the very previous activity period and end time of the very previous activity period; or may be the start time and activity period of the very previous activity period; or may be the end time and activity period of the very previous activity period; or may be an activity period.

The word "previous" in the preceding two paragraphs may be replaced with "next".

Besides, if the coordinator node does not send any beacon, data frame, or command frame within the third preset time interval, the coordinator needs to send an additional beacon, which facilitates the pending node to join the network. For example, it is predefined that the coordinator node should receive and send at least one frame every 100 ms, where the frame may be a beacon, a data frame, or a command frame. Therefore, if the coordinator node neither receives nor sends any frame within 100 ms set on the timer, the coordinator node sends an additional beacon.

The additional beacon is a beacon sent additionally on the basis of the beacons sent normally. The additional beacon should avoid colliding with the existing superframe time sequence as far as possible, and should not be sent in the time segments already occupied. For example, the additional beacon should not be sent in the beacon time segment of other coordinator nodes or in the dedicated timeslot of other device nodes. The additional beacon may be sent in random access mode, namely, sent at non-fixed time, but the timestamp of the additional beacon needs to indicate the start time of the beacon sent periodically. The coordinator node may send the additional beacon in the sleep time segment and the low-traffic time segment.

In the second embodiment described above, superframe time sequence indication information is added to a data frame and/or a command frame, where the data frame and/or the command frame is transmitted between the device node and the coordinator node, and therefore, the pending node can obtain necessary information required for requesting to join the network by monitoring the data frame and/or the command frame. In this way, the pending node can obtain the necessary information required for requesting to join the network in both the periodical sleep period of the coordinator node and the process of transmitting a series of packets in the network. Moreover, the pending node can request to join the network no matter whether the pending node monitors the beacon or monitors the data frame and/or the command frame, where the data frame and/or the command frame is transmitted between the device node and the coordinator node. Therefore, the association delay is reduced and the network mobility is improved without increasing network implementation costs or affecting network density or network energy consumption performance. Besides, when multiple pending nodes exist, each pending node can request to join the network by monitoring a beacon or monitoring a data frame and/or a command frame. Therefore, the phenomenon that multiple pending nodes request to join the network simultaneously in a certain period after monitoring the same beacon is avoided, and the probability of collisions in the process of requesting to join the network is reduced, namely, the collisions of transmitting the requests for joining the network are reduced. Because the pending node can also obtain the beacon information required for requesting to join the network by monitoring the data frame and/or the command frame, the pending node can obtain the beacon information in different ways, which improves reliability of transmitting the beacon information. If the coordinator node does not send any beacon, data frame and/or command frame within the third preset time interval, the coordinator node sends an additional beacon, which avoids long association delay when the traffic is low and further reduces the mean association delay.

Embodiment 3

Method for a Pending Node to Join a Network

Figure 6:
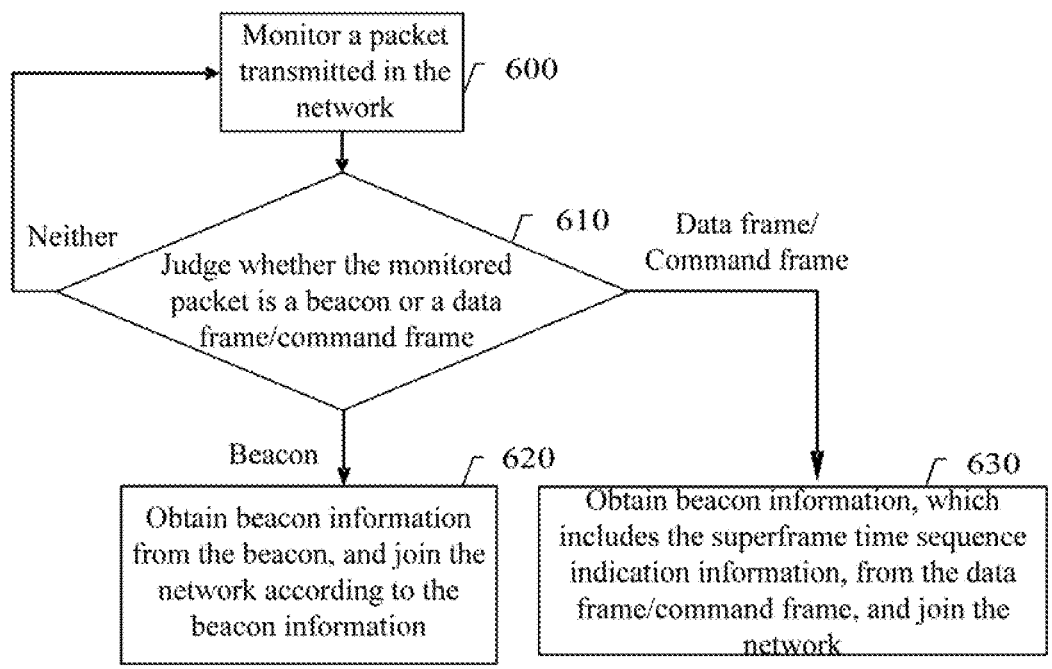
FIG. 6 is a flowchart of a method for a pending node to join a network according to a third embodiment of the present invention.

The flowchart of the method is as shown in FIG. 6.

Step 600 in FIG. 6: The pending node monitors a packet transmitted in the network, and the procedure proceeds to step 610 when the pending node monitors a packet. The pending node may monitor the packet transmitted in the network directly without sending any beacon request; or the pending node may send one or more beacon requests first and then monitor the packet transmitted in the network.

The packet transmitted in the network include: data frame, command frame, and beacon. It should be noted that in this embodiment, it is assumed that the superframe time sequence indication information is carried in the data frame and command frame sent by the coordinator node to the device node and/or the data frame and command frame sent by the device node to the coordinator node. In practice, the superframe time sequence indication information may be carried in only the data frame, or only the command frame. If the superframe time sequence indication information is carried in only the data frame or only the command frame, the way that the pending node joins the network is basically the same as the process described in this embodiment, and is not exemplified here.

Step 610: The pending node judges whether the monitored data packet is a beacon, or a data frame that carries superframe time sequence indication information, or a command frame that carries superframe time sequence indication information. If the pending node judges that the monitored packet is a beacon, the procedure proceeds to step 620. If the pending node judges that the monitored packet is a data frame or a command frame, where the data frame or the command frame carries superframe time sequence indication information, the procedure proceeds to step 630. If the pending node judges that the monitored packet is neither a beacon nor a data frame or a command frame, where the data frame or the command frame carries superframe time sequence indication information, or if the superframe time sequence indication information carried in the data frame or the command frame forbids the pending node to join the network, the pending node may discard the monitored packet, and the procedure returns to step 600 to go on monitoring the packet transmitted in the network. The superframe time sequence indication information is the same as the superframe time sequence indication information described in the preceding second embodiment. The command frame includes: association requests sent by other pending nodes to the coordinator node according to the monitored data frame or the monitored command frame, and an association response sent by the coordinator node to other pending nodes, where the association response carries the beacon information unknown to other pending nodes.

Step 620: The pending node obtains beacon information from the beacon if the beacon is monitored, and requests to join the network according to the obtained beacon information, for example, the pending node sends an association request to the coordinator node according to the beacon information obtained from the beacon.

Step 630: The pending node obtains beacon information, which includes superframe time sequence indication information, from the monitored data frame or the monitored command frame. The beacon information carried in the data frame or the command frame includes information such as a coordinator address (namely, the source address or destination address of the data frame or the command frame), a network identifier, superframe time sequence indication information, and a security attribute. The pending node requests to join the network according to the beacon information that includes the superframe time sequence indication information. For example, the pending node sends an association request to the coordinator node within the first preset time interval through the monitored network operating channel according to the beacon information obtained from the data frame or the command frame.

It should be noted that if merely the data frame and the command frame sent by the coordinator node to the device node carry the superframe time sequence indication information, the pending node can obtain the source address information from the monitored data frame and command frame, and use the source address as a coordinator address; if merely the data frame and the command frame sent by the device node to the coordinator node carry the superframe time sequence indication information, the pending node can obtain the destination address information from the monitored data frame and command frame, and use the destination address as a coordinator address; if the superframe time sequence indication information is carried in the data frame and command frame sent by the coordinator node to the device node and is carried in the data frame and command frame sent by the device node to the coordinator node, the pending node determines whether to use the source address or destination address of the data frame or the command frame as the coordinator address according to the coordinator indication information carried in the monitored data frame or the monitored command frame. That is, the coordinator indication information indicates whether the data frame or the command frame is sent by the coordinator node to the device node, or by the device node to the coordinator node. The coordinator indication information may be a flag bit. For example, if the coordinator indication information is 1, it indicates that the coordinator address is the source address of the data frame or the command frame; if the coordinator indication information is 0, it indicates that the coordinator address is the destination address of the data frame or command frame.

If the pending node joins the network according to the monitored data frame or the monitored command frame, the association request sent by the pending node to the coordinator node may carry the information indicating that the pending node requests to join the network by monitoring the data frame or the command frame. The information may be a flag bit used to request the coordinator node for the beacon information unknown to the pending node. The beacon information unknown to the pending node is described in the preceding second embodiment, and is not further described here.

It should also be noted that because link quality is not the beacon information required by the pending node for joining the network, the pending node does not need to obtain the link quality information when joining the network according to the monitored data frame or the monitored command frame. In fact, the pending node can determine the link quality according to the energy of the received data frame or command frame and/or the signal quality of the received data frame or command frame of the received data frame or command frame. In this way, the pending node can use the determined link quality to send the association request when joining the network according to the monitored data frame or command frame.

If the beacon, or the data frame or the command frame is not received within the second time interval, the pending node may send a beacon request which requests the coordinator to send the beacon, so as to join the network in time. The coordinator may send an additional beacon directly after receiving the beacon request. Another scenario is: After receiving the beacon request, the coordinator judges the time interval between the current time and the next time of sending the beacon normally. If the time interval is less than the preset value, the coordinator node does not send any additional beacon, but sends the beacon in normal mode after the time interval expires; if the time interval is not less than the preset value, the coordinator node sends the additional beacon. The additional beacon also needs to avoid colliding with the existing superframe time sequence as far as possible.

In the preceding third embodiment, the pending node monitors the data frame and/or the command frame, where the data frame and/or the command frame carries superframe time sequence indication information and is transmitted between the device node and the coordinator node; once such a data frame and/or a command frame is monitored or a beacon is monitored, the pending node requests to join the network. Therefore, the association delay is reduced and the network mobility is improved without increasing network implementation costs or affecting network density or network energy consumption performance. Besides, when multiple pending nodes exist, each pending node can request to join the network by monitoring a beacon or monitoring a data frame and/or monitoring command frame. Therefore, the phenomenon that multiple pending nodes request to join the network simultaneously in a certain period after monitoring the same beacon is avoided, and the probability of collisions in the process of requesting to join the network is reduced, namely, the collisions of transmitting the requests for joining the network are reduced. Because the pending node can also obtain the beacon information required for requesting to join the network by monitoring the data frame and/or the command frame, the pending node can obtain the beacon information in different ways, which improves reliability of transmitting the beacon information. If the pending node does not receive any beacon, data frame and/or command frame within the second preset time interval, the pending node sends a beacon request, which avoids long association delay when the coordinator node has low traffic or sleeps, and further reduces the mean association delay.

Embodiment 4

Network Device

Figure 7:
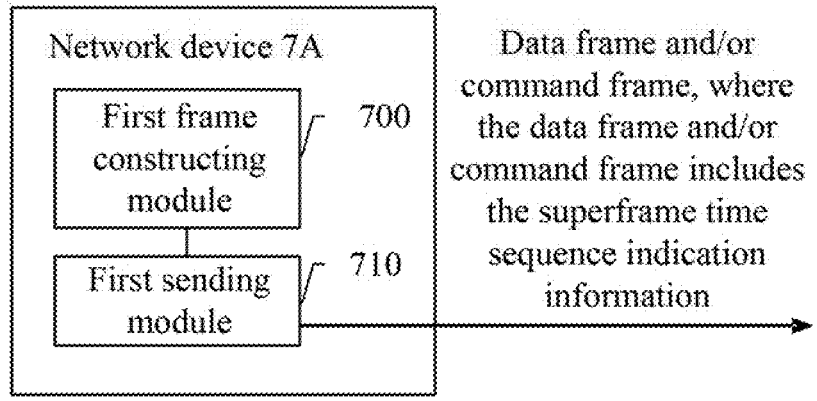
FIG. 7 is a schematic structural diagram of a network device according to a fourth embodiment of the present invention.

The structure of the network device is as shown in FIG. 7.

The network device 7A in FIG. 7 includes a first frame constructing module 700 and a first sending module 710. The network device 7A may be a device node or coordinator node.

The first frame constructing module 700 is configured to carry superframe time sequence indication information in a data frame and/or a command frame during the process of communication between a device node and a coordinator node. The device node may be a device node that has already joined the network, or a device node that has not joined the network.

The first frame constructing module 700 may carry the superframe time sequence indication information in the data frame only, or carry the superframe time sequence indication information in the command frame only, or carry the superframe time sequence indication information in both the data frame and the command frame. The superframe time sequence indication information may be the existing superframe time sequence information or simplified 1-bit information, which has been described in the preceding embodiment and is not further described here.

Further, the first frame constructing module 700 may carry coordinator indication information in the data frame and/or the command frame. Examples of the coordinator indication information and examples of the data frame or the command frame, where the data frame or the command frame carries the superframe time sequence information and coordinator indication information, are given in the preceding embodiment, and are not further described here.

The first sending module 710 sends the data frame and/or the command frame, where the data frame and/or the command frame is constructed by the first frame constructing module 700 and includes the superframe time sequence indication information.

Embodiment 5

Network Device

Figure 8:
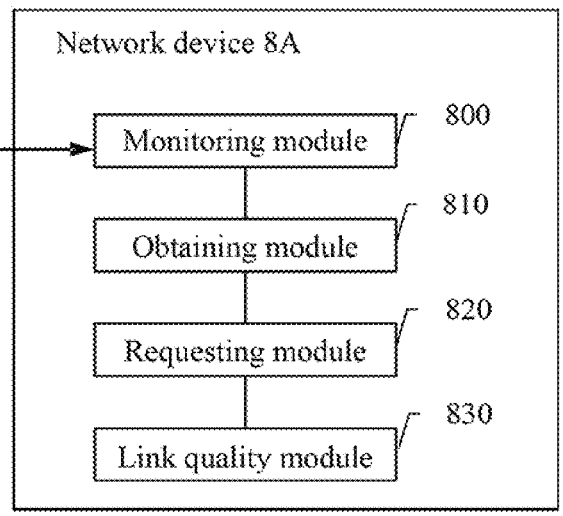
FIG. 8 is a schematic structural diagram of a network device according to a fifth embodiment of the present invention.

The structure of the network device is as shown in FIG. 8.

The network device 8A in FIG. 8 includes a monitoring module 800, an obtaining module 810, and a requesting module 820. Optionally, the network device 8A may further include a link quality module 830.

The monitoring module 800 is configured to monitor a packet transmitted in a network. The monitoring module 800 may send one or more beacon requests first and then monitor the packet transmitted in the network, or monitor the packet transmitted in the network directly without sending any beacon request. The packet transmitted in the network includes various forms such as a data frame, command frame, and beacon. It should be noted that in this embodiment, it is assumed that the superframe time sequence indication information is carried in the data frame and command frame sent by the coordinator node to the device node and/or the data frame and command frame sent by the device node to the coordinator node. In practice, the superframe time sequence indication information may be carried in only the data frame, or only the command frame. If the superframe time sequence indication information is carried in only the data frame or only the command frame, the operations performed by the monitoring module 800, obtaining module 810, and requesting module 820 are basically the same as the process described in this embodiment, and are not exemplified here.

The obtaining module 810 judges whether the packet monitored by the monitoring module 800 is a beacon, or a data frame that carries superframe time sequence indication information, or a command frame that carries superframe time sequence indication information. The obtaining module 810 obtains beacon information from the beacon when judging that the packet monitored by the monitoring module 800 is a beacon. The obtaining module 810 obtains the beacon information, which includes superframe time sequence indication information, from the monitored data frame or monitored command frame when judging that the packet monitored by the monitoring module 800 is a data frame or a command frame, where the data frame or the command frame carries the superframe time sequence indication information. The beacon information carried in the data frame or the command frame includes: coordinator address (namely, source address or destination address of the data frame or the command frame), network identifier, superframe time sequence indication information, and security attribute. When the obtaining module 810 judges that the packet monitored by the monitoring module 800 is neither a beacon nor a data frame or a command frame that carry superframe time sequence indication information, or when the superframe time sequence indication information carried in the data frame or command frame forbids the pending node to join the network, the obtaining module 810 may discard the monitored packet, and the monitoring module 800 goes on monitoring the packet transmitted in the network. The superframe time sequence indication information is the same as the superframe time sequence indication information described in the preceding second embodiment. The command frame includes: association requests sent by other pending nodes to the coordinator node according to the monitored data frame or the monitored command frame, and an association response sent by the coordinator node to other pending nodes, where the association response carries the beacon information unknown to other pending nodes.

The information obtained by the obtaining module 810 is provided to the requesting module 820. The source address and the destination address in the data frame or the command frame obtained by the obtaining unit 810 are described in the preceding embodiment, and are not further described here.

The requesting module 820 requests to join the network according to the beacon information obtained by the obtaining module 810 from the beacon, or requests to join the network through a network operating channel monitored by the monitoring module according to the beacon information obtained by the obtaining module 810 from the data frame or command frame. An example of requesting to join a network by the requesting module 820 is: The requesting module 820 sends an association request to the coordinator node within the first preset time interval through the network operating channel monitored by the monitoring module 800 according to the beacon information obtained by the obtaining module 810 from the data frame or the command frame.

If the pending node joins the network according to the monitored data frame or the monitored command frame, the association request sent by the requesting module 820 may carry the information indicating that the pending node requests to join the network by monitoring the data frame or the command frame. The information may be a flag bit used to request the coordinator node for the beacon information unknown to the pending node. The beacon information unknown to the pending node is described in the preceding second embodiment, and is not further described here.

The link quality is not the beacon information required by the pending node for joining the network. However, the link quality module 830 may determine the link quality according to the energy of the data frame or the command frame received by the network device and/or signal quality of the data frame or the command frame received by the network device, and provides the determined link quality to the requesting module 820. Therefore, the requesting module 820 can use the link quality information when requesting to join the network.

If the monitoring module 800 does not receive the beacon, or the data frame or the command frame within the second time interval, the requesting module 820 may send a beacon request which requests the coordinator node to send the beacon. In this way, the pending node can join the network in time.

Embodiment 6

Network Device

The network device may be a coordinator node in a beacon-based network. The structure of the network is as shown in FIG. 9.

Figure 9:
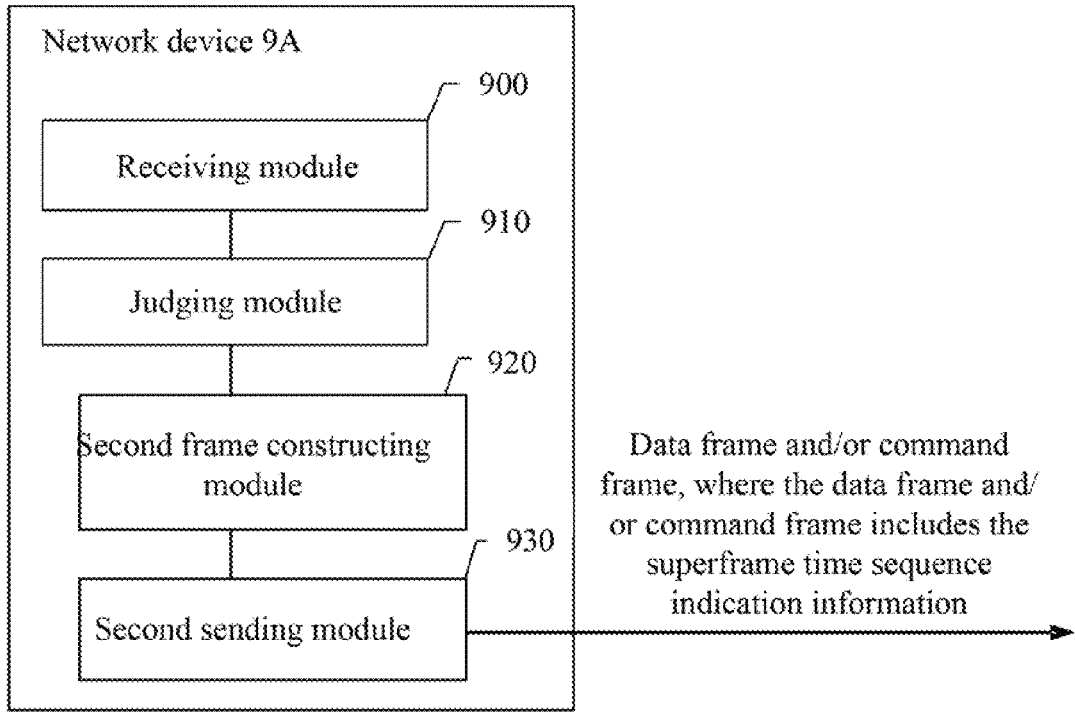
FIG. 9 is a schematic structural diagram of a network device according to a sixth embodiment of the present invention.

The network device 9A in FIG. 9 includes: a receiving module 900, a judging module 910, a second frame constructing module 920, and a second sending module 930.

The receiving module 900 receives an association request sent by the pending node.

The judging module 910 judges whether the association request received by the receiving module 900 carries information indicating that the pending node requests to join the network by monitoring the data frame or the command frame, and notifies the second frame constructing module 920 if the association request carries such information. The second frame constructing module 920 carries beacon information unknown to the pending node in an association response according to the notification from the judging module 910.

The second sending module 930 sends the association response to the pending node. In this case, the association response is an association response extended to carry the beacon information unknown to the pending node. The beacon information unknown to the pending node may be BO, SO, dedicated timeslot position, and beacon position. The beacon information unknown to the pending node may also be BO, SO, and coordinator sleep time sequence. The beacon information unknown to the pending node may also be BO, SO, and coordinator activity time sequence.

If the judging module 910 judges that the association request carries no information indicating that the pending node requests to join the network by monitoring the data frame or the command frame, the judging module 910 may notify the second frame constructing module 920 or may not notify the second frame constructing module 920. The second frame constructing module 920 may construct an association response according to the existing protocol if no notification is received or the received notification indicates that the association request carries no such information, and the second sending module 930 sends an association response to the pending node.

Besides, the judging module 910 may further judge whether the coordinator node does not send any beacon, data frame or command frame within the third preset time interval, and, if the coordinator node does not send any beacon, data frame or command frame within the third preset time interval, notify the second frame constructing module 920 to construct an additional beacon, and the second sending module 920 sends the additional beacon.

After reading the foregoing embodiments, those skilled in the art are clearly aware that the present invention may be implemented through hardware, or, preferably in most circumstances, through software in addition to a necessary universal hardware platform. Therefore, all or part of the contributions of the present invention to the prior art may be embodied in a software product. The software product may be stored in a storage medium such as a ROM, a RAM, a magnetic disk, or a compact disk, and incorporates several instructions for instructing a computer device (such as a personal computer, a server, or a network device) to execute the method specified in any embodiment of the present invention or part of the embodiment.

Although the invention has been described through several exemplary embodiments, the invention is not limited to such embodiments. It is apparent that those of ordinary skill in the art can make various modifications and variations to the invention without departing from the spirit and scope of the invention. The invention is intended to cover the modifications and variations provided that they fall within the scope of protection defined by the following claims or their equivalents.

What is claimed is:

1. A method for joining a network, comprising:
   monitoring a packet transmitted in the network;
   obtaining beacon information from a beacon if the beacon is monitored, and requesting to join the network according to the beacon information obtained from the beacon;
   obtaining the beacon information if superframe time sequence indication information indicates permission of joining the network, which includes the superframe time sequence indication information, from a data frame or a command frame, wherein the data frame or the command frame carries the superframe time sequence indication information, and sending a request for joining the network through a channel of the data frame or the command frame within a first preset time interval;
   sending a beacon request to the coordinator if the beacon, or the data frame or the command frame is not received within a second time interval.

2. The method according to claim 1, wherein:
   the request for joining the network carries information about requesting to join the network by monitoring the data frame or the command frame; and
   the method further comprises: receiving unknown beacon information sent by a coordinator according to the information about requesting to join the network by monitoring the data frame or the command frame.

3. The method according to claim 2, wherein the unknown beacon information comprises one of the group consisting of:

(a) Beacon Order (BO), Superframe Order (SO), dedicated timeslot position, and beacon position;
(b) the BO, the SO, and coordinator sleep time sequence; and
(c) the BO, the SO, and coordinator activity time sequence.

4. The method according to claim 1, wherein:
the data frame or the command frame further carries coordinator indication information; and
the step of requesting to join the network through the channel of the monitored data frame or the monitored command frame according to the beacon information obtained from the monitored data frame or the monitored command frame comprises:
determining whether an address of a coordinator is a source address or destination address in the data frame or the command frame according to the coordinator indication information, and sending a request for joining the network to the coordinator through the channel of the monitored data frame or the monitored command frame according to the beacon information obtained from the monitored data frame or the monitored command frame.

5. The method according to claim 1, further comprising:
determining link quality according to at least one of the group consisting of (a) energy of the received data frame or command frame, and (b) signal quality of the received data frame or command frame.

6. The method according to claim 1, wherein:
the beacon information that includes the superframe time sequence indication information comprises: the superframe time sequence indication information, a coordinator address, and a network identifier.

7. A method for transmitting frames in a beacon-based network, comprising:
carrying superframe time sequence indication information in at least one of a data frame and a command frame, by at least one of a device node and a coordinator node, during communication between the device node and the coordinator node; and
sending the at least one of the data frame and the command frame, wherein the at least one of the data frame and the command frame includes the superframe time sequence indication information;
receiving a request for joining the network, by the coordinator node, from a pending node;
carrying beacon information unknown to the pending node in a join response after the request for joining the network carries information indicating that the pending node requests to join the network by monitoring the data frame or monitoring the command frame, and sending the join response to the pending node;
wherein the unknown beacon information comprises one of the group consisting of:
(a) Beacon Order (BO), Superframe Order (SO), dedicated timeslot position, and beacon position;
(b) the BO, the SO, and coordinator slew time sequence; and
(c) the BO, the SO, and coordinator activity time sequence.

8. The method according to claim 7, wherein:
the superframe time sequence indication information comprises: start time of a beacon, superframe structure, dedicated timeslot position, and superframe time sequence information; or information indicating that a pending node is allowed to request to join a network within a first preset time interval.

9. The method according to claim 7, wherein:
the data frame or the command frame further carries coordinator indication information indicating whether an address of the coordinator node is a source address or destination address in the data frame or command frame.

10. The method according to claim 7, further comprising:
sending, by the coordinator node, an additional beacon if the coordinator node does not send any beacon, data frame, or command frame within a third preset time interval.

11. A network device, comprising:
a processor, configured to monitor a packet transmitted in a network, and requesting to join the network according to beacon information obtained from the beacon;
the processor, configured to obtain the beacon information from a beacon if the beacon is monitored, and; obtain the beacon information if superframe time sequence indication information indicates permission of joining the network, which includes the superframe time sequence indication information, from the data frame or the command frame, wherein the data frame or the command frame carries the superframe time sequence indication information;
a transfer, configured to send a request for joining the network through the channel of the monitored data frame or the monitored command frame within a first preset time interval.

12. The network device according to claim 11, the processor further configured to determine link quality according to at least one of the group consisting of (a) energy of the data frame or the command frame received by the network device, and (b) signal quality of the data frame or the command frame received by the network device, and provide the determined link quality so that the transfer can request to join the network by using the link quality.

13. A network device, comprising:
a processor, configured to
carry superframe time sequence indication information in at least one of a data frame and a command frame during communication between the network device and a coordinator node;
carrying beacon information unknown to the pending node in a join response after the request for joining the network carries information indicating that the pending node requests to join the network by monitoring the data frame or the command frame;
a transmitter, configured to
send the at least one of the data frame and the command frame constructed by the processor;
send the join response to the pending node;
a receiver, configured to receive a request for joining the network from a pending node;
wherein the unknown beacon information comprises at least one of the group consisting of:
(a) Beacon Order (BO), Superframe Order (SO), dedicated timeslot position, and beacon position;
(b) the BO, the SO, and coordinator slew time sequence; and
(c) the BO, the SO, and coordinator activity time sequence.

* * * * *

UNITED STATES PATENT AND TRADEMARK OFFICE
CERTIFICATE OF CORRECTION

PATENT NO.       : 8,594,034 B2
APPLICATION NO.  : 13/215716
DATED            : November 26, 2013
INVENTOR(S)      : Yongjun Liu Page 1 of 1

It is certified that error appears in the above-identified patent and that said Letters Patent is hereby corrected as shown below:

In the Claims:

Column 19, Claim 7, line 56 "coordinator slew time" should read

-- coordinator sleep time --.

Column 20, Claim 13, line 44 "carrying beacon information" should read

-- carry beacon information --.

Column 20, Claim 13, line 59 "coordinator slew time" should read

-- coordinator sleep time --.

Signed and Sealed this
Twenty-fifth Day of February, 2014

Michelle K. Lee
*Deputy Director of the United States Patent and Trademark Office*